Figure 1:
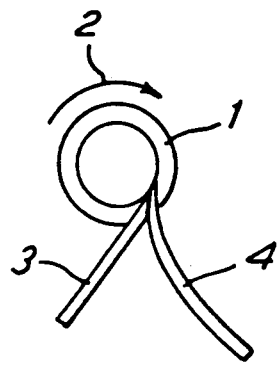
Figure 1:
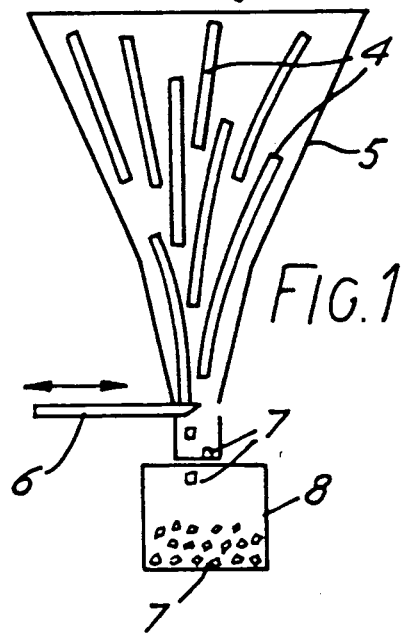

United States Patent [19]

Biggs et al.

[11] Patent Number: 5,053,449
[45] Date of Patent: Oct. 1, 1991

[54] PLASTICS MATERIAL

[75] Inventors: Ian S. Biggs, High Wycombe; Bronislaw Radvan, Flackwell Heath, both of England

[73] Assignee: The Wiggins Teape Group Limited, Basingstoke, England

[21] Appl. No.: 277,181

[22] Filed: Nov. 29, 1988

[30] Foreign Application Priority Data

Aug. 3, 1988 [GB] United Kingdom ............... 8818425

[51] Int. Cl.$^5$ ............................................... C08K 3/36
[52] U.S. Cl. ..................................... 524/493; 521/82; 521/91; 521/94; 523/214; 524/494; 428/296; 428/407
[58] Field of Search ............... 521/91, 94, 82; 523/214; 524/494, 493; 428/407, 296

[56] References Cited

U.S. PATENT DOCUMENTS

| | | | |
|---|---|---|---|
| 1,875,018 | 8/1932 | Kliefoth | 162/171 |
| 1,901,382 | 3/1933 | Stevenson | 162/165 |
| 2,388,187 | 10/1945 | Salle | 162/145 |
| 2,653,870 | 9/1953 | Kast | 162/148 |
| 2,715,755 | 8/1955 | Jones | 264/518 |
| 2,795,524 | 6/1957 | Rodman | 525/177 |
| 2,892,107 | 6/1959 | Williams et al. | 310/358 |
| 2,962,414 | 11/1960 | Arledter | 162/145 |
| 3,200,181 | 8/1965 | Rudloff | 264/122 |
| 3,216,841 | 11/1965 | Thellman | 106/208 |
| 3,396,062 | 8/1968 | White | 156/245 |
| 3,428,518 | 2/1969 | Schafer | 428/378 |
| 3,452,128 | 6/1969 | Rains | 264/126 |
| 3,489,827 | 1/1970 | Mueller et al. | 264/50 |
| 3,494,824 | 2/1970 | Roberts | 162/152 |
| 3,573,158 | 3/1971 | Pall et al. | 162/131 |
| 3,607,500 | 9/1971 | Field | 264/119 |
| 3,621,092 | 11/1971 | Hofer | 264/322 |
| 3,734,985 | 5/1973 | Greenberg | 264/45 |

(List continued on next page.)

FOREIGN PATENT DOCUMENTS 230504 2/1958 Australia.
559853 7/1983 Australia.
0071219 2/1983 European Pat. Off..
0148760 7/1985 European Pat. Off..
0152994 8/1985 European Pat. Off..
0173382 3/1986 European Pat. Off..
3420195 12/1985 Fed. Rep. of Germany.

(List continued on next page.)

OTHER PUBLICATIONS

1004 Abstracts Bulletin of the Institute of Paper Chemistry, vol. 53 (1982) Aug. No. 2, Appleton, Wis., U.S.A.
"Polymer Processing", James M. McKelvey, 1962.
"Paints and Varnishes—Determination of Flow Time by Use of Flow Cups", International Standard ISO 2431, 1984.
"Part A6, Determination of Flow Time by Use of Flow Cups", British Standards Institution, 1984.
"Fibre Foam", Turner & Cogswell, 1976, presented at VIIth International Congress on Rheology in Sweden, Aug. 23–Aug. 27, 1976.

Primary Examiner—Paul R. Michl
Assistant Examiner—Yong S. Lee
Attorney, Agent, or Firm—Burns, Doane, Swecker & Mathis

[57] ABSTRACT

An air permeable sheet-like structure comprising 20% to 60% by weight of single discrete reinforcing fibres having a high modulus of elasticity (as herein defined), and being between about 7 and about 50 millimeters long and 40% to 80% by weight of wholly or substantially unconsolidated elements of thermoplastics material, and in which the fibrous and thermoplastics components are bonded into an air permeable structure, at least some of said elements of thermoplastics material each having a first dimension of not more than 1 millimeters, a second dimension of between 1.5 millimeters and 30 millimeters, a total volume of not more than 30 cubic millimeters and a surface area to volume ratio greater than about 4:1, with any further elements of thermoplastics material present each having a volume of less than about 1.8 cubic millimeters.

19 Claims, 1 Drawing Sheet

U.S. PATENT DOCUMENTS

| | | | |
|---|---|---|---|
| 3,832,115 | 8/1974 | Ettel | 425/373 |
| 3,837,986 | 9/1974 | Gorter et al. | 161/59 |
| 3,850,723 | 11/1974 | Ackley | 156/180 |
| 3,856,614 | 12/1974 | Susuki et al. | 161/159 |
| 3,865,661 | 2/1975 | Hata et al. | 156/79 |
| 3,873,336 | 3/1975 | Lambert et al. | 106/464 |
| 3,891,738 | 6/1975 | Shen | 264/101 |
| 3,897,533 | 7/1975 | Hani et al. | 264/137 |
| 3,903,343 | 9/1975 | Pfaff | 428/168 |
| 3,930,917 | 1/1976 | Esakov et al. | 156/78 |
| 3,975,483 | 8/1976 | Rudloff | 264/137 |
| 3,980,511 | 9/1976 | Proucelle | 156/79 |
| 3,980,613 | 9/1976 | Bachot et al. | 264/45.3 |
| 4,007,083 | 2/1977 | Ring et al. | 162/101 |
| 4,081,318 | 3/1978 | Wietsma | 162/157 R |
| 4,104,340 | 8/1978 | Ward | 264/6 |
| 4,104,435 | 8/1978 | Ballesteros | 428/288 |
| 4,153,760 | 5/1979 | Sundberg et al. | 429/252 |
| 4,159,294 | 6/1979 | Oishi et al. | 264/45.3 |
| 4,178,411 | 12/1979 | Cole et al. | 428/310 |
| 4,207,378 | 6/1980 | Klein | 428/407 |
| 4,234,652 | 11/1980 | Vanoni et al. | 428/296 |
| 4,242,404 | 12/1980 | Bondoc et al. | 428/220 |
| 4,273,981 | 6/1981 | Nopper | 264/120 |
| 4,286,977 | 9/1981 | Klein | 55/524 |
| 4,327,164 | 4/1982 | Feinberg et al. | 429/144 |
| 4,339,490 | 7/1982 | Yoshioka et al. | 428/213 |
| 4,359,132 | 11/1982 | Parker et al. | 181/169 |
| 4,362,778 | 12/1982 | Andersson et al. | 428/240 |
| 4,386,943 | 6/1983 | Gumbel et al. | 51/298 |
| 4,393,154 | 7/1983 | Tyler et al. | 524/12 |
| 4,399,085 | 8/1983 | Belbin et al. | 264/41 |
| 4,426,470 | 1/1984 | Wessling et al. | 524/35 |
| 4,440,819 | 4/1984 | Rosser et al. | 428/107 |
| 4,451,539 | 5/1984 | Vallee et al. | 428/515 |
| 4,469,543 | 9/1984 | Segal et al. | 156/283 |
| 4,481,248 | 11/1984 | Fraige | 428/283 |
| 4,495,238 | 1/1985 | Adiletta | 428/215 |
| 4,498,957 | 2/1985 | Sasaki et al. | 162/146 |
| 4,503,116 | 3/1985 | Lapidus | 428/286 |
| 4,508,777 | 4/1985 | Yamamoto et al. | 428/280 |
| 4,512,836 | 4/1985 | Tucci | 156/174 |
| 4,543,288 | 9/1985 | Radvan et al. | 428/297 |
| 4,562,033 | 12/1985 | Johnson et al. | 264/510 |
| 4,568,581 | 2/1986 | Peoples, Jr. | 428/35 |
| 4,595,617 | 6/1986 | Bogdany | 428/95 |
| 4,613,647 | 9/1986 | Yonaiyama et al. | 524/494 |
| 4,643,940 | 2/1987 | Shaw et al. | 428/308.4 |
| 4,649,014 | 3/1987 | Tochikawa | 264/555 |
| 4,659,528 | 4/1987 | Plowman et al. | 264/49 |
| 4,663,225 | 5/1987 | Farley et al. | 428/290 |
| 4,670,331 | 6/1987 | Radvan et al. | 428/303 |
| 4,690,860 | 9/1987 | Radvan et al. | 428/290 |
| 4,710,520 | 12/1987 | Klein | 521/82 |
| 4,719,039 | 1/1988 | Leonardi | 252/511 |
| 4,734,321 | 3/1988 | Radvan et al. | 428/283 |
| 4,765,915 | 8/1988 | Diehl | 521/91 |
| 4,892,904 | 1/1990 | Ting | 524/494 |
| 4,957,805 | 9/1990 | Biggs et al. | 428/223 |
| 4,978,489 | 12/1990 | Radvan et al. | 264/122 |
| 4,981,636 | 1/1991 | Bayly et al. | 264/114 |

FOREIGN PATENT DOCUMENTS

| | | |
|---|---|---|
| 364533 | 11/1987 | Fed. Rep. of Germany . |
| 56-37373 | 4/1981 | Japan . |
| 462024 | 10/1968 | Switzerland . |
| 448138 | 6/1936 | United Kingdom . |
| 703023 | 1/1954 | United Kingdom . |
| 729381 | 5/1955 | United Kingdom . |
| 843154 | 8/1960 | United Kingdom . |
| 855132 | 11/1960 | United Kingdom . |
| 871117 | 6/1961 | United Kingdom . |
| 1008833 | 11/1965 | United Kingdom . |
| 1058932 | 2/1967 | United Kingdom . |
| 1110659 | 4/1968 | United Kingdom . |
| 1113792 | 5/1968 | United Kingdom . |
| 1129757 | 10/1968 | United Kingdom . |
| 1133606 | 11/1968 | United Kingdom . |
| 1134785 | 11/1968 | United Kingdom . |
| 1198324 | 7/1970 | United Kingdom . |
| 1204039 | 9/1970 | United Kingdom . |
| 1230789 | 5/1971 | United Kingdom . |
| 1231937 | 5/1971 | United Kingdom . |
| 1263812 | 2/1972 | United Kingdom . |
| 1305982 | 2/1973 | United Kingdom . |
| 1306145 | 2/1973 | United Kingdom . |
| 1329409 | 9/1973 | United Kingdom . |
| 1330485 | 9/1973 | United Kingdom . |
| 1348896 | 3/1974 | United Kingdom . |
| 1412642 | 11/1975 | United Kingdom . |
| 1424682 | 2/1976 | United Kingdom . |
| 2051170 | 1/1981 | United Kingdom . |
| 2065016 | 6/1981 | United Kingdom . |
| 2093474 | 9/1982 | United Kingdom . |
| 2096195 | 10/1982 | United Kingdom . |

PLASTICS MATERIAL

This invention relates to thermoplastics material elements In particular, it relates to such material for use in conjunction with reinforcing fibres, such as glass fibres, for forming aqueous dispersions from which open webs of the fibre and plastic can be formed by deposition and drainage on a foraminous support. Such webs are subsequently subjected to heat and pressure to form mouldings or consolidated or permeable sheets for subsequent moulding.

In European Patent Application No. 85300031.3 (Publication No. 0 148 760), a process is described and claimed for forming such a web from a foamed aqueous dispersion, in which the plastics material is in the form of powder comprising particles no larger than 1.5 millimeters and preferably larger than 1.0 millimeter. The use of larger particles was thought to prevent the development of sufficient plastics flow during moulding to produce a homogeneous moulded structure, and also results in a significant lessening in the flexural modulus of the material when consolidated by moulding.

Currently, the preferred size for the plastics particles is from 20 to 1,000 microns, and optimally between 300 and 500 microns in order to achieve maximum homogeneity in mouldings and to maximize the flexural modulus.

The only commercially available materials which can be directly used in the formation of such aqueous dispersions are synthetic textile fibres and certain plastics powders. Textile fibres are very expensive because of their fineness and of the critical dimensional specification according to which such fibres are produced. Plastics powders of the appropriate dimension must be produced by freeze grinding from blocks or granules at a substantial cost.

It has been found that, provided certain dimensional criteria are not exceeded, textile fibres and powders can be substituted by much larger elements of thermoplastics material without substantially affecting the flexural modulus or strength of fibre reinforced plastics material made using such elements.

According to the present invention therefore an air permeable sheet-like structure comprises 20% to 60% by weight of single discrete reinforcing fibres having a high modulus of elasticity (as herein defined), and being between about 7 and about 50 millimeters long and 40% to 80% by weight of wholly or substantially unconsolidated elements of thermoplastics material, and in which the fibrous and thermoplastics components are bonded into an air permeable structure, at least some of said elements of thermoplastics material each having a first dimension of not more than 1 millimeter, a second dimension of between 1.5 millimeters and 30 millimeters, a total volume of not more than 30 cubic millimeters and a surface area to volume ratio greater than about 4:1, with any further elements of thermoplastics material present each having a volume of less than about 1.8 cubic millimeters.

A high modulus of elasticity is to be taken as meaning a modulus of elasticity substantially higher than that of a consolidated sheet which could be formed from the structure. Reinforcing fibres falling into this category include glass, carbon and ceramix fibres and fibres such as the aramid fibres sold under the trade names Kevlar and Nomex and will generally include any fibre having a modulus higher than 10,000 Mega Pascals.

Preferably the first dimension is not less than 0.02 millimeters and is not greater than 0.7 millimeters. It has been found that if the first dimension is between 0.3 and 0.5 millimeters very satisfactory results can be obtained.

The elements of thermoplastic materials may for example be made of polyethylene, polypropylene, polystyrene, acrilonitryl-butadiene-styrene, polyethyleneterephthalate, polybutyleneterephthalate or polyvinylchloride both plasticised and unplasticised. Other suitable thermoplastics include polyphenylene ether or polycarbonates or polyestercarbonates or thermoplastic polyesters or polyetherimides or acrylonitrile-butylacrylate-styrene polymers or amorphous nylon or polyarylene ether ketone or alloys and blends of these materials with each other or other polymeric materials. In one example, the preferred plastics material is nylon 6.

The invention also includes a process for the manufacture of a permeable sheet-like fibrous structure which includes forming a web with 20% to 60% of single discrete fibres having a high modulus of elasticity (as herein defined) and between 7 millimeters and 50 millimeters long, and 40% to 80% by weight of a wholly or substantially unconsolidated elements of thermoplastics material, and then treating the web to bond the fibres and thermoplastics material together and in which at least some of said elements of thermoplastics material each have a first dimension of not more than 1 millimeter, a second dimension or between 1.5 millimeters and 30 millimeters, a total volume of not more than 30 cubic millimeters and a surface area to volume ratio greater than 4:1, with any further elements of thermoplastic material present each having a volume of less than about 1.8 cubic millimeters.

The various dimensions of the elements referred to with regard to the permeable sheet-like structure are also applicable for use in the process.

The process may also include the steps of producing said particulate thermoplastics material elements by forming a sliver of said plastics material and cutting said sliver into elements each having dimensions as above specified.

The sliver of thermoplastics material from which the particles are cut may be formed by paring the sliver from a solid mass of said synthetic thermoplastics material. The mass may comprise a bar which is turned or reciprocated in engagement with a cutting tool so as to generate the sliver.

Alternatively, molten thermoplastics material may be extruded through a die and cooled in air or water, being cut by a rotary tool during or after cooling.

It has now been appreciated that, provided the specified overall dimensional criteria are met, the particular configuration of the plastics elements is not critical to their effective use in the formation of fibre reinforced thermoplastic materials. This facilitates the use of the various processes described for making the elements, which can be operated to produce the elements at a much lower cost than the processes which must necessarily be used for the manufacture of textile fibres or powders.

The present invention incorporates and can be performed according to the method and apparatus as set forth in European Patent Application No. 85300031.3 (Publication No. 0 148 760), corresponding to U.S. Pat. No. 4,734,321, the disclosure of which is hereby incorporated by reference herein.

It will be appreciated however that the plastics material set forth in the European Patent Application will be replaced at least in part by particulate plastics material comprising elements which have a first dimension of not more than 1 millimeter, a second dimension of between 1.5 and 30 millimeters, a total volume or not more than 30 cubic millimeters and a surface area to volume ratio greater than about 4:1.

The particulate plastics material for use in the invention can be produced in many ways but a number of methods will now be described by way of example and with reference to FIGS. 1 to 4 of the accompanying drawings which show four alternative methods of forming a sliver and cutting it into particles of appropriate size.

FIG. 1 shows a rod 1 of plastics material which is rotated in the direction of the arrow 2 in engagement with a cutting tool 3 so as to produce swarf-like slivers 4 which fall into a hopper 5. At the lower end of the hopper 5, a reciprocating knife 6 cuts the slivers 4 into particles 7 which fall into a receptacle 8.

Figure 2:
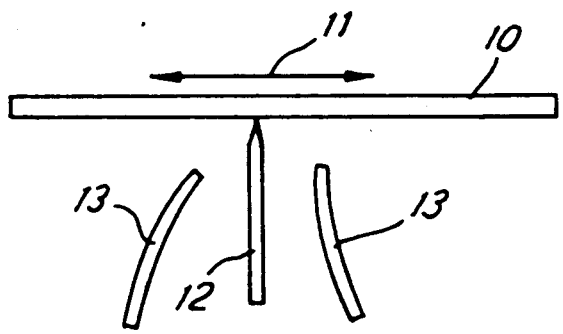

Referring now to FIG. 2, a bar 10 of thermoplastics material is reciprocated in the direction of the arrow 11 passed a scraping tool 12 which produces slivers 13. The slivers 13 fall into a hopper and are cut as described above with reference to FIG. 1.

Figure 3:
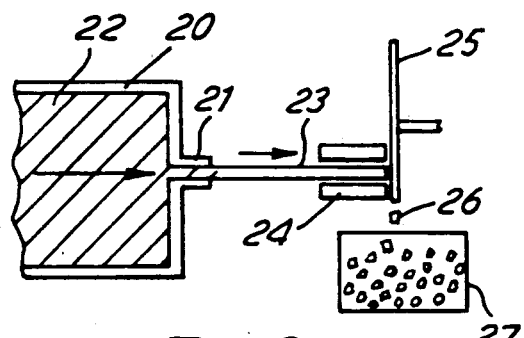

Referring now to FIG. 3, this shows a die casing 20 having a die 21 through which molten thermoplastic 22 is driven in a conventional manner. A rod 23 forms on cooling and extends through a cutting block 24 against which a rotary cutter 25 operates. The butter 25 cuts particles 26 from the rod which are collected in a receptacle 27.

Figure 4:
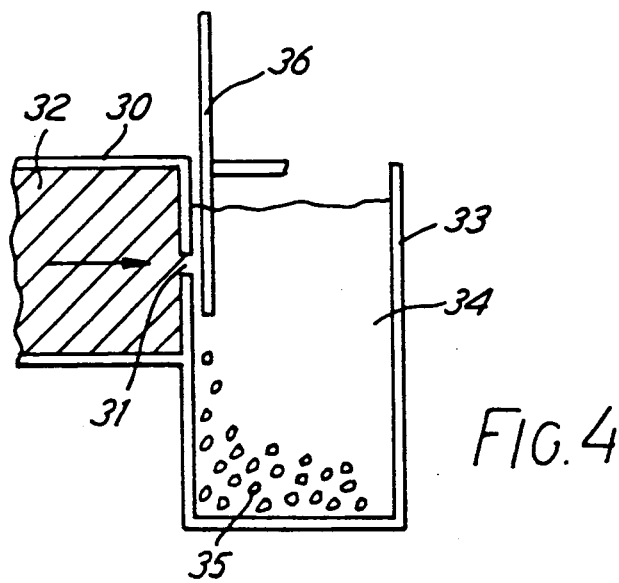

Turning now to FIG. 4, a die casing 30 has an opening 31 through which molten thermoplastic 32 is driven under pressure into an integral container 33 which is filled with water 34. On passing through the die 31, the thermoplastics material 32 is cut into particles 35 by a rotary cutter 36.

In the embodiments of FIGS. 1 to 4, the particles are cut to the dimensions hereinabove specified for use in the formation of an aqueous dispersion with reinforcing fibres.

The optimum dimensions will vary depending upon the characteristics of the material concerned, thus, some materials have an inherently higher flexural modulus than others for given surface area to volume ratios.

The accompanying Table 1 lists various examples of material made according to the process and which can be used in the manufactured material.

In order to manufacture the polycarbonate elements different sizes of polycarbonate film sold under the Registered Trade Mark LEXAN were shredded or cut to various sizes and used to make sheets with 30% by weight of single discrete glass fibres 13 millimeters long, 11 microns in diameter. A single sheet was formed which, after drying, was folded into four before consolidation in a hot press and cooling. Samples were cut from the cooled consolidated sheet and tested for flexural properties. The sheets were also assessed for appearance and test samples were cut.

To act as a control, particles were cut to a small size which was within the particle size of known thermoplastic powder whilst its Surface Area:Vol. ratio was higher. This material therefore was suitable as a control with a particle volume of less than 1.8 cubic millimeters being the volume of a sphere 1.5 millimeters in diameter. On the basis of this comparison there was bound to be no significant loss of flexural properties resulting from the use of particles within the dimensional criteria specified hereinabove, although surface defects become evident in sheets embodying high volume particles, for example the particle volumes of 60 cubic millimeters which represent a surface area to volume ratio of less than 4 (2:3).

With Nylon 6 samples were produced from a billet of Nylon 6 by shaving or skiving with various machine tools and sheets made in the same manner as for polycarbonate. One sample was produced as a very fine fluff which, having a particle volume of less than 1.8 cubic millimeters was used as a control.

As will be seen from Table 1, there is a pattern of generally diminishing properties with increasing particulate volume. This drop is statistically significant for the third sample for flexural strength but not flexural modulus.

Polypropylene powder sold by ICI Ltd. under the trade reference PXC 81604 was used to extrude fine rods at different diameters which were subsequently chopped to various lengths. In this case polypropylene powder having a particle size of less than 1 millimeters was used as a control.

Three ply sheets were made, dried and consolidated. All flexural modulus results from sheets made using rods were found to be slightly lower than those made using powder though not statistically different. Flexural strength results are also slightly lower but acceptable.

It has thus been found that thermoplastic elements in a form other than powder and having volumes greater than 1.8 cubic millimeters may be usefully employed without serious, (that is more than 10%) loss of flexural modulus. These elements may take the form of shredded film, plastics shavings or extruded/cut elements made by the methods described above. The precise shape or means of production for the elements is not critical, so long as one dimension is less than 1 millimeters (and preferably less than 0.7 millimeters), another dimension is less than 30 millimeters and the Surface Area:Volume Ratio greater than 4:1. Such particles having a volume of up to 30 cubic millimeters are satisfactory.

The invention therefore provides a low cost thermoplastics material suitable for fibre reinforced plastics manufacture, which is not currently commercially available and also facilitates the use of low cost waste plastics materials.

TABLE 1

EXAMPLES ILLUSTRATING THE USE OF POLYMER PARTICLES HAVING HIGH VOLUME IN FORMS OTHER THAN POWDER

| Polymer | Shape | Approx. Dimensions (mm) | Particle Volume (mm$^3$) | Surface Area: Vol. Ratio | Flexural Modulus (MPa) | Flexural Strength (MPa) |
|---|---|---|---|---|---|---|
| Polycarbonate | (Control) | | <1.8 | | 5290 | 144 |
| | Shredded Film | .25 × 6 × 20 | 30.0 | 8.0 | 6560 | 148 |
| | | .5 × 3 × 8 | 12.0 | 4.7 | 5300 | 144 |
| | | .5 × 6 × 10 | 30.0 | 4.3 | 5200 | 142 |

TABLE 1-continued
EXAMPLES ILLUSTRATING THE USE OF POLYMER PARTICLES HAVING HIGH VOLUME IN FORMS OTHER THAN POWDER

| Polymer | Shape | Approx. Dimensions (mm) | Particle Volume (mm³) | Surface Area: Vol. Ratio | Flexural Modulus (MPa) | Flexural Strength (MPa) |
|---|---|---|---|---|---|---|
| Nylon 6 | Fluff | 1.0 × 6 × 10 | 60.0 | 2.3 | 4660 | 130 |
| | (Control) | | <1.8 | | 7980 | 219 |
| | Ribbons | .07 × 2 × 20 | 2.8 | 30.0 | 7710 | 192 |
| | | .2 × 3.5 × 25 | 18.0 | 10.0 | 7340 | 183 |
| | | .7 × 2.5 × 25 | 44.0 | 3.6 | 6630 | 176 |
| Polypropylene | Powder (Control) | | <1.8 | | 4100 | 115 |
| | Rods | .7 dia × 21 | 8.0 | 5.9 | 3880 | 95 |
| | | 1.0 dia × 11 | 8.6 | 4.2 | 3560 | 89 |

We claim:

1. An air permeable sheet-like structure comprising 20% to 60% by weight of a fibrous component being single discrete reinforcing fibres having a high modulus of elasticity, and between about 7 and about 50 millimeters long and 40% to 80% by weight of a thermoplastics component being wholly or substantially unconsolidated elements of thermoplastics material, and in which the fibrous and thermoplastics components are bonded into an air permeable structure, at least some of said elements of thermoplastics materials each having a first dimension of not more than 1 millimeters, a second dimension of between 1.5 millimeters and 30 millimeters, a total volume of at least 1.8 but not more than 30 millimeters and a surface area to volume ratio greater than about 4:1, with any further elements of thermoplastics material present each having a volume of less than about 1.8 cubic millimeters.

2. An air permeable sheet-like structure as claimed in claim 1 in which the said first dimension is not less than 0.02 millimeters.

3. An air permeable sheet-like structure as claimed in claim 1 in which said first dimension is less than 0.7 millimeters.

4. An air permeable sheet-like structure as claimed in claim 3 in which the said first dimension is between 0.3 and 0.5 millimeters.

5. An air permeable sheet-like structure as claimed in claim 1 in which said particulate plastics material is selected from the group consisting of a thermoplastic, a thermosetting plastic, and a mixture of thermoplastic and thermosetting plastic.

6. An air permeable sheet-like structure as claimed in claim 5 in which said plastics material is polyethylene, polypropylene, polystyrene, acrylonitylstyrene butadiene, polyethylene terephthalate, or polyvinyl chloride polycarbonate, both plasticised and unplasticised.

7. An air permeable sheet-like structure as claimed in claim 5 in which said plastics material is nylon 6.

8. A process for the manufacture of a permeable sheet-like fibrous structure which includes forming an aqueous dispersion of 20% to 60% of single discrete fibers having a high modulus of elasticity and between 7 millimeters and 50 millimeters long, and 40% to 80% by weight of wholly or substantially unconsolidated elements of thermoplastics material, laying down and draining said aqueous dispersion on a foraminous support to form a web, and then treating the web to bond the fibers and thermoplastics material together and in which at least some of said elements of thermoplastics material each having a first dimension of not more than 1 millimeter, a second dimension of between 1.5 millimeters and 30 millimeters, a total volume of at least 1.8 but not more than 30 cubic millimeters and a surface area to volume ratio greater than 4:1, with any further elements of thermoplastic material present each having a volume of less than about 1.8 cubic millimeters.

9. A process as claimed in claim 8 in which the said first dimension is not less than 0.02 millimeters.

10. A process as claimed in claim 8 in which said first dimension is less than 0.7 millimeters.

11. A process as claimed in claim 10 in which the said first dimension is between 0.3 and 0.5 millimeters.

12. A process as claimed in claim 8 in which said plastics material is selected from the group consisting of a thermoplastic, a thermosetting plastic, and a mixture of thermoplastic and thermosetting plastic.

13. A process as claimed in claim 12 in which said plastics material is polyethylene, polypropylene, polystyrene, acrylonitylstyrene butadiene, polyethylene terephthalate, or polyvinyl chloride polycarbonate, both plasticised and unplasticised.

14. A process as claimed in claim 13 in which said plastics material is nylon 6.

15. A process as claimed in claim 8 which includes the steps of producing said elements of plastics material elements by forming a sliver of said plastics material and cutting said sliver into elements each having dimensions as stated.

16. A process as claimed in claim 15 which includes forming the sliver of plastics material by passing the sliver from a solid mass of said plastics material.

17. A process as claimed in claim 16 in which said mass is provided by a base which is twined or reciprocated in engagement with a cutting tool so as to generated the sliver.

18. A process as claimed in claim 15 in which molten plastics material is extruded through a die and cooled in air or water, the extruded material being cut by a rotary tool during or after cooling.

19. A process according to claim 8, wherein said dispersion is formed.

* * * * *